UNITED STATES PATENT OFFICE.

JULIUS FEHR, OF HOBOKEN, NEW JERSEY.

IMPROVEMENT IN DEODORIZING, DISINFECTING, AND ANTISEPTIC POWDERS.

Specification forming part of Letters Patent No. 173,607, dated February 15, 1876; application filed June 23, 1875.

*To all whom it may concern:*

Be it known that I, JULIUS FEHR, of Hoboken, in the county of Hudson and State of New Jersey, have invented a new and Improved Antiseptic Deodorizing Disinfectant-Powder, which invention is fully set forth in the following specification.

This invention relates to an improvement on a sanitary powder for which Letters Patent of the United States were granted to me September 23, 1873, No. 143,133, and which consists of a mixture of silicate of magnesia, carbolic acid, and oxide of zinc.

My present improvement consists in an antiseptic, deodorizing, or sanitary powder composed of silicate of magnesia and salicylic acid, whereby the objectionable odor of the carbolic acid is avoided, and a mixture is obtained which, by its antiseptic and anti-zymotic properties, serves in a great measure to counteract contagion, and to prevent inflammation of the skin.

In carrying out my invention I take silicate of magnesia, one thousand parts; salicylic acid, two parts, both being reduced to a fine powder, and then I mix these ingredients intimately together. Instead of using the salicylic acid in the form of a powder, I also use the same in the form of a solution, in alcohol or any other suitable solvent, which solution, when mixed with the powdered silicate of magnesia, is readily absorbed, so that when the mixture is completed it is perfectly dry, and the salicylic acid is intimately incorporated with the silicate of magnesia.

My sanitary powder, when applied to the sensitive parts of the human body, keeps said parts pure, and it forms a very soothing application to chafed skin; also for scalds and burns, for chapped hands, and it can be used with great advantage as a baby-powder; also as a tooth-powder, and for the purpose of drying ladies' hair.

It may be used either plain or perfumed, to suit the taste of consumers.

What I claim as new, and desire to secure by Letters Patent, is—

A deodorizing and disinfecting powder consisting of silicate of magnesia and salicylic acid, in about the proportions herein specified.

In testimony that I claim the foregoing I have hereunto set my hand and seal.

JULIUS FEHR. [L. S.]

Witnesses:
 J. VAN SANTVOORD,
 E. F. KASTENHUBER.